(12) United States Patent
Ni et al.

(10) Patent No.: US 12,541,877 B2
(45) Date of Patent: Feb. 3, 2026

(54) STRUCTURED-LIGHT PROJECTOR, CAMERA ASSEMBLY, AND ELECTRONIC DEVICE

(71) Applicant: Rockchip Electronics Co., Ltd., Fuzhou (CN)

(72) Inventors: Qiang Ni, Fuzhou (CN); Jiang Han, Fuzhou (CN)

(73) Assignee: Rockchip Electronics Co., Ltd., Fuzhou (CN)

( * ) Notice: Subject to any disclaimer, the term of this patent is extended or adjusted under 35 U.S.C. 154(b) by 873 days.

(21) Appl. No.: 17/865,420

(22) Filed: Jul. 15, 2022

(65) Prior Publication Data

US 2023/0017619 A1    Jan. 19, 2023

(30) Foreign Application Priority Data

Jul. 16, 2021   (CN) .......................... 202110806773.9
Dec. 30, 2021   (CN) .......................... 202123432541.6

(51) Int. Cl.
  *G02B 27/09*   (2006.01)
  *G06T 7/80*    (2017.01)

(52) U.S. Cl.
  CPC ............. *G06T 7/80* (2017.01); *G02B 27/0944* (2013.01); *G02B 27/0972* (2013.01); *G06T 2207/10048* (2013.01)

(58) Field of Classification Search
  CPC ............ G02B 27/0972; G02B 27/0944; G02B 27/42; G02B 27/0093; G02B 27/0172; G02B 27/1093; G02B 27/0101; G02B 27/4205; G03B 21/204; G01B 11/2513
  See application file for complete search history.

(56) References Cited

U.S. PATENT DOCUMENTS

| | | | |
|---|---|---|---|
| 2004/0022685 A1* | 2/2004 | Singh ................. | G01N 33/5304 |
| | | | 422/82.08 |
| 2016/0197452 A1* | 7/2016 | Mor ........................ | H01S 5/423 |
| | | | 359/569 |
| 2016/0238790 A1* | 8/2016 | Chen ..................... | G02B 6/4213 |
| 2017/0195654 A1* | 7/2017 | Powers .................. | G02B 27/30 |
| 2019/0264890 A1* | 8/2019 | Chang ................. | G01B 11/2513 |
| 2019/0293954 A1* | 9/2019 | Lin ......................... | G02B 27/30 |
| 2021/0325578 A1* | 10/2021 | Liu ........................ | G01S 7/481 |
| 2021/0341702 A1* | 11/2021 | He ........................ | G06F 1/1686 |
| 2022/0413154 A1* | 12/2022 | Hsiao ................. | G02B 3/0037 |

* cited by examiner

Primary Examiner — Ephrem Z Mebrahtu
(74) Attorney, Agent, or Firm — IPRTOP LLC (57) ABSTRACT

A structured-light projector, a camera assembly, and an electronic device are provided. The structured-light projector includes: a first light source, configured to emit a first light beam; a diffractive optical element, provided on a light-emitting side of the first light source and configured to generate structured light based on the first light beam incident on the diffractive optical element; an optical steering element, provided between the first light source and the diffractive optical element; and a second light source, wherein the second light source includes a light emitter, configured to emit a second light beam, the second light beam comprising infrared light. Via the structured-light projector, a scattered image and an infrared image of the target object can be acquired simutanously.

16 Claims, 4 Drawing Sheets

STRUCTURED-LIGHT PROJECTOR, CAMERA ASSEMBLY, AND ELECTRONIC DEVICE

CROSS REFERENCE TO RELATED APPLICATION

The present application claims the benefit of priority to Chinese Patent Application No. CN 202123432541.6, entitled "Structured-light projector, camera assembly, and electronic device", filed with CNIPA on Dec. 30, 2021, and Chinese Patent Application No. CN 202110806773.9, entitled "Structured-light projector, camera assembly, and electronic device", filed with CNIPA on Jul. 16, 2021, the disclosures of which are incorporated herein by reference in their entirety for all purposes.

FIELD OF TECHNOLOGY

The present disclosure generally relates to optics, in particular, to a structured-light projector, a camera assembly, and an electronic device.

BACKGROUND

In recent years, 3D imaging has been increasingly used in consumer electronics. Via 3D imaging technology, a 3D image of a target object can be generated, as long as depth information of the target object can be obtained. 3D structured light is one of the mainstream technologies to realize 3D imaging. Its basic principle is to project light with certain structural characteristics onto the target object through a near-infrared laser, and the light is then captured by an infrared camera to obtain a depth image of the target object.

Structured-light projectors are key devices of 3D structured-light assemblies, and on the current market, a structured-light projector mainly includes a light source, a collimating mirror, and a diffractive optical element, all of which are stacked together. Because these components all have a certain thickness, the total thickness of the structured-light projector usually exceeds 4 mm. However, consumer electronics are getting thinner and thinner, imposing higher requirements for the existing structured-light projectors. Therefore, how to design a thinner structured-light projector has become an urgent technical problem to be solved.

SUMMARY

The present disclosure provides a structured-light projector, comprising: a first light source, configured to emit a first light beam; a diffractive optical element, installed on a light-emitting side of the first light source and configured to generate structured light based on the first light beam incident on the diffractive optical element; an optical steering element, positioned between the first light source and the diffractive optical element; and a second light source, wherein the second light source includes a light emitter, configured to emit a second light beam, the second light beam comprising infrared light.

In an embodiment, the second light source is a surface-emitting light source and emits infrared flood light based on the second light beam.

In an embodiment, the second light source further includes an optical micro-structure, wherein the optical micro-structure is configured to adjust optical paths of the second light beam, and the second light source emits infrared flood light based on the second light beam through the optical micro-structure.

In an embodiment, the second light source further includes an optical homogenizer, and the second light source emits uniform infrared flood light based on the second light beam through the optical homogenizer.

In an embodiment, the light emitter includes a vertical-cavity surface-emitting laser, a side-emitting laser, or a light-emitting diode.

In an embodiment, the second light source is located in an out-of-focus position of the diffractive optical element, and the second light beam passes through the diffractive optical element to form infrared flood light.

In an embodiment, the structured-light projector further includes an optical steering element, located between the first light source and the diffractive optical element, and configured to steer the first light beam entering from a first port of the optical steering element toward a second port of the optical steering element so that the first light beam is emitted from the second port.

In an embodiment, the optical steering element includes a first right-angled trapezoidal prism, and a second right-angled trapezoidal prism, wherein the two right-angled trapezoidal prisms have bevels set opposite to each other and parallel to each other.

In an embodiment, the structured-light projector further includes an optical homogenizer, wherein the optical homogenizer is positioned on a side of the second right-angled trapezoidal prism away from the second light source, wherein the second right-angled trapezoidal prism face is closer to the second light source than the first light source, and faces the second light source, wherein the second light beam passes through two parallel bottom surfaces of the second right-angled trapezoidal prisms, then reaches the optical homogenizer, and then pass through the optical homogenizer to form infrared flood light.

In an embodiment, the structured-light projector further includes a first fixing plate and a second fixing plate, each of the two right-angled trapezoidal prism has a first side surface and an opposite second side surface, both parallel to the bevels, on which the first side surfaces of the two first and second right-angled trapezoidal prisms are disposed; in contact with the first fixing plate, and a second fixing plate, on which the second side surfaces of the two first and second right-angled trapezoidal prisms are disposed, in contact with the second fixing plate; wherein each of the first and second right-angled trapezoidal prisms has the first side surface and the second side surface opposite to the first side surface, and both the first and second side surfaces are parallel to the bevels.

In an embodiment, the optical steering element is a rhomboidal prism, which refracts the first light beam entering from the first port and then steers the first light beam out of the second port.

In an embodiment, the angle between a side surface and a top surface of the rhomboidal prism, and the angle between a side surface and a bottom surface of the rhomboidal prism are both 45°, and the rhomboidal prism has a refractive index greater than 1.6 at its operating wavelength.

In an embodiment, the top surface and bottom surface of the rhomboidal prism are coated with transmission-enhancing films.

In an embodiment, the structured-light projector further includes a substrate, and the substrate supports the first light source and the second light source.

In an embodiment, the structured-light projector further includes an optical-energy detecting element, and the optical-energy detecting element detects optical power of the first light beam reflected back by the diffractive optical element.

In an embodiment, the diffractive optical element includes a first diffractive optical element, disposed on a side of the optical steering element away from the first light source, and configured to focus and replicate the first light beam from the optical steering element to form the structured light, and a second diffractive optical element, positioned disposed on one a side of the first diffractive optical element away from the optical steering element, and configured to replicate the structured light, and/or to adjust light intensity distribution of the structured light.

The present disclosure also provides another structured-light projector, comprising: a light source, configured to emit light; a diffractive optical element, positioned on a light-emitting side of the light source and configured to generate structured light based on the light incident on the diffractive optical element; and an optical-energy detecting element, positioned on a side of the diffractive optical element proximate to the light source and configured to detect the optical energy of the light after it has been reflected by the diffractive optical element.

The present disclosure also provides a camera assembly, comprising a structured-light projector mentioned above; an image collector configured to collect a pattern formed by light emitted by the structured-light projector; and an image processor, electrically coupled to the image collector and configured to perform image processing on the pattern.

The present disclosure also provides an electronic device, comprising the camera assembly mentioned above.

In the structured-light projector described in one or more embodiments of the present disclosure, the first light beam can be generated using the first light source, the first light beam then passes through the diffractive optical element to form the structured light, and when the structured light irradiates the target object, a scattered image on the surface of the target object can be captured using the image collector. Meanwhile, the second light beam can be generated using the second light source, the second light beam is infrared light, and when the second light beam irradiates the target object, an infrared image of the target object can be captured using the image collector. Thus, the structured-light projector of the present disclosure can acquire both a scattered image and an infrared image of the target object. Also, the structured-light projector includes an optical steering element, steering the first light beam emitted from the first light source, thus reducing the thickness of the structured-light projector while the effective focal length of the diffractive optical element remains unchanged.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout can also be more complicated. In addition, in this document, relationship terms such as "first", "second", etc. are used only to distinguish one entity or operation from another, and do not necessarily require or imply any such actual relationship or sequence between these entities or operations.

In the description of the present disclosure, it is to be understood that the terms "center", "longitudinal", "transverse", "length "front", "back", "left", "right", "vertical ", "horizontal", "top", "bottom", "inside", "outside "outside", "clockwise", "counterclockwise" and the like indicate orientation or positional relationships shown in the accompanying drawings, and they are intended only to facilitate and simplify the description of the invention, and are not intended to indicate or imply that the equipment or components referred to must have a particular orientation, be constructed and operate in a particular orientation, and are therefore not to be construed as limiting the present disclosure.

In the present disclosure, unless otherwise expressly specified, the terms "mounted", "attached", "connected", "fixed", etc. shall be used in a broad sense; for example, the corresponding connections can be fixed connections, or detachable connections, or the corresponding elements may be formed in one piece; the corresponding connections may also be mechanical connections or electrical connections;

the corresponding connections may also be direct connections or indirect connections through intermediate media; the corresponding elements may be connected through their own internal parts, or by interaction between the two elements. To a person of ordinary skill in the art, the specific meaning of the above terms in the context of the present disclosure can be understood on a case-by-case basis.

In the present disclosure, unless otherwise expressly specified and limited, when a first feature is "on" or "under" a second feature, the two features may be in direct or indirect contact. Also, when a first feature is "above", "on" and "over" a second feature, the first feature may be directly over the second feature, or simply higher than the second feature. When a first feature is "below", "under" and "beneath" a second feature, the first feature may be directly under the second feature, or simply lower than the second feature.

In some structured light technologies, image collectors cannot capture a scattered image and an infrared image of the target object at the same time. In addition, a conventional structured-light projector mainly includes a light source, a collimating mirror, and a diffractive optical element (DOE), which are stacked together. And the total thickness of the conventional structured-light projector is usually more than 4 mm because all three of the above components have a certain thickness.

At least to address the above considerations, the present disclosure provides a structured-light projector. In the structured-light projector, a first light beam can be generated using a first light source, the first light beam then passes through a diffractive optical element to form structured light. When the structured light irradiates the target object, a scattered image on the surface of the target object can be captured using an image collector. Meanwhile, a second light beam can be generated using a second light source, the second light beam is infrared light, and when the second light beam irradiates the target object, an infrared image of the target object can be captured using the image collector. Thus, via the structured-light projector of the present disclosure, both a scattered image and an infrared image of the target object can be acquired at the same time. Moreover, this structured-light projector includes an optical steering element, which can steer the first light beam emitted from the first light source, thus further reducing the thickness of this structured-light projector while the effective focal length of the diffractive optical element remains unchanged.

In the following, specific embodiments of the present disclosure will be described by exemplary embodiments with reference to the accompanying drawings.

Figure 1:
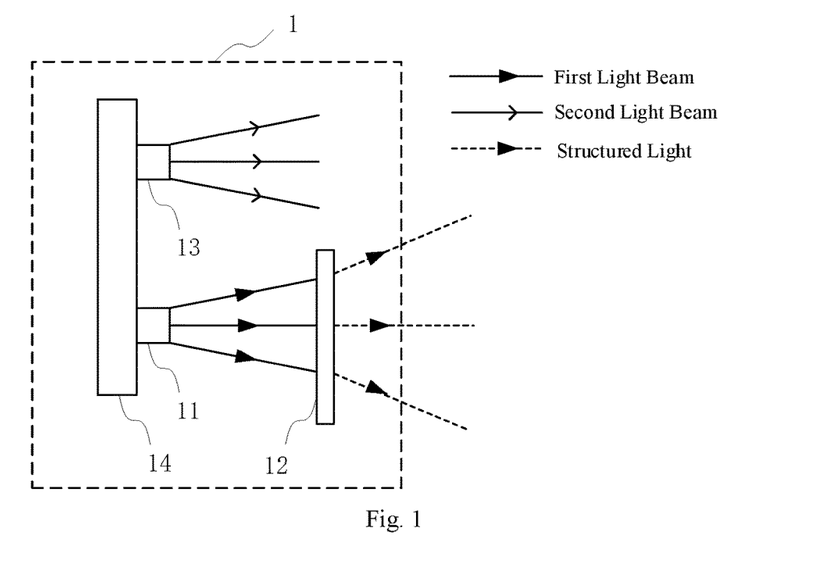
FIG. 1 shows a schematic structural diagram of a structured-light projector according to an embodiment of the present disclosure.

FIG. 1 shows a schematic structural diagram of a structured-light projector according to an embodiment of the present disclosure. As shown in FIG. 1, the structured-light projector 1 includes, among other components not shown in FIG. 1, a first light source 11, a diffractive optical element 12, and a second light source 13.

The first light source 11 is configured to emit a first light beam, and the diffractive optical element 12 may be installed on a light-emitting side of the first light source 11 and is configured to generate structured light based on the first light beam incident on the diffractive optical element 12. The structured light may generate a scattered image when irradiating/illuminating the surface of the target object.

The second light source 13 includes a light emitter, configured to emit a second light beam, wherein the second light beam includes infrared light.

Optionally, the structured-light projector 1 may further include a substrate 14 configured to support the first light source 11 and the second light source 13. The substrate 14 is preferably a ceramic substrate.

In some embodiments, the second light source 13 is a surface-emitting light source and emits infrared flood light (broad beamed light) as the second light beam. In some embodiments, a plurality of light emitters may function as a flood light source (or surface-emitting light source) for the second light source 13, by arranging these light emitters at different locations and/or at different heights on the second light source device.

As can be seen from the above description, the structured-light projector 1 is capable of projecting structured light to the target object using the first light source 11 and the diffractive optical element 12, and alternatively or simultaneously projecting infrared light to the target object using the second light source 13. The structured light reaches the target object and produces a structured-light pattern on the surface of the target object. Therefore, the image collector can acquire both the scattered image and the infrared image of the target object.

Optionally, the first light source 11 includes a Vertical-Cavity Surface-Emitting Laser (VCSEL), or an Edge Emitting Laser (EEL). The first light beam emitted by the first light source 11 may have a wavelength range of, for example, 800 nm to 1000 nm.

Optionally, the light emitter of the second light source 13 includes, for example, a VCSEL, an EEL, or a light-emitting diode. The light emitted by the light emitter may have a wavelength range of, for example, 800 nm to 1000 nm.

Optionally, one or more of the VCSELs may have a plurality of light-emitting points, with the number of the light-emitting points being, for example, greater than 100, and the light-emitting points have a pseudo-random spatial distribution.

Optionally, the first light source 11 and the second light source 13 are driven by a light source driver to emit the first light beam and the second light beam in a time-sharing manner. That is, the two light sources may or may not emit light at the same time. In some embodiments, the light source driver may be included within the structured-light projector. In some embodiments, the light source driver is positioned outside of the structured-light projector and is electrically coupled to the structured-light projector.

Optionally, the second light source 13 further includes an optical micro-structure, the optical micro-structure may be configured to adjust optical paths of the second light beam, and the second light source 13 emits infrared flood light based on the second light beam through the optical micro-structure. In some embodiments, the light emitter is a flip-chip VCSEL. The optical micro-structure is, for example, a free-form surface micro-lens array. In other embodiments, the second light source 13 may emit infrared flood light directly through the VCSEL.

Optionally, the second light source 13 further includes an optical homogenizer, and the second light source 13 is configured to emit a uniform infrared flood light based on the second light beam through the optical homogenizer. In some embodiments, the light emitter includes, for example, light-emitting diodes. In other embodiments, the second light source 13 may emit infrared flood light directly through the light-emitting diodes.

Optionally, the second light source 13 is set in an out-of-focus position of the diffractive optical element 12 and the second light beam passes through the diffractive optical element 12 to form the infrared flood light.

According to an embodiment of the present disclosure, the structured-light projector 1 further includes an optical steering element 15 (not shown in FIG. 1), located between the first light source 11 and the diffractive optical element 12, and configured to steer the first light beam entering from a first port of the optical steering element 15 toward a second port of the optical steering element so that the first light beam is emitted from the second port 15. The introduction of the optical steering element 15 in this embodiment enables the steering of the first light beam emitted out of the first light source, thereby greatly reducing the thickness of the structured-light projector while the effective focal length of the diffractive optical element remains unchanged.

Figure 2A:
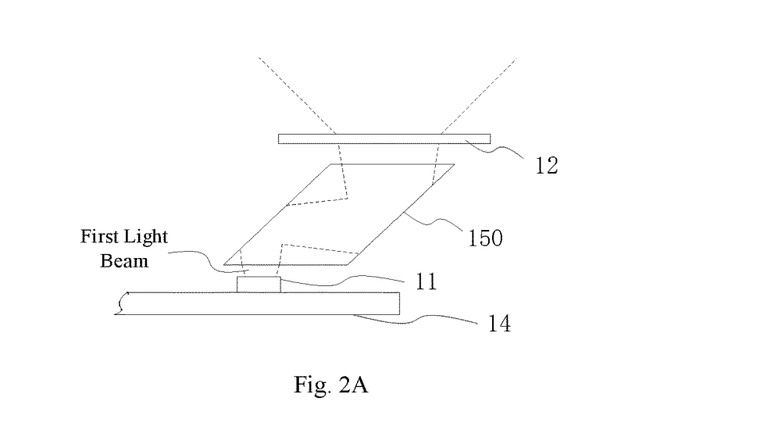
FIG. 2A shows a partial structural diagram of a structured-light projector according to an embodiment of the present disclosure, comprising an optical steering element formed by a rhomboidal prism.

FIG. 2A shows a schematic diagram of a portion of the structure of the structured-light projector in this disclosed embodiment, comprising an optical steering element formed by a rhomboidal prism. In this embodiment, the optical steering element 15 is a rhomboidal prism 150, positioned between the first light source 11 and the diffractive optical element 12.

In some embodiments, the rhomboidal prism 150 may be used to refract the first light beam entering from its first port and then to steer the first light beam out of its second port. The first port is the light-entry port of the rhomboidal prism 150 near or close to the first light source 11, and the second port is the light-exiting port of the rhomboidal prism 150 near or close to the diffractive optical element 12. The "steering" herein may refer to the transmitting of the light without changing the overall direction and propagation of the light beams when entering and exiting the rhomboidal prism 150. In other words, even though light beams may be reflected, deflected, or changed direction when passing through the inside of the rhomboidal prism 150, the light beams before entering the rhomboidal prism 150 may have the same direction and propagation as the light beams transmitting out of the rhomboidal prism 150.

The diffractive optical element 12 is used to focus (collimate) and replicate the first light beam from the second port of the rhomboidal prism to form the structured light which produces a structured-light pattern on the surface of the target object when the structured light illuminates the target object.

In application, the first light beam may first be emitted from the first light source 11, and then be steered when passing through the rhomboidal prism 150. The steered light beams may further pass through the diffractive optical element 12 to form the structured light. Since the diffractive optical element 12 has a certain effective focal length, the larger the focal length of the diffractive optical element 12, the denser the structured-light pattern may be produced on the surface of the target object, and the better the 3D imaging effect of the target object may become. Therefore, the structured-light projector 1 innovatively introduces the rhomboidal prism 150 in order to reduce the thickness of the structured-light projector 1 by steering the first light beam so that the effective focal length of the diffractive optical element 12 remains unchanged. The introduction of the rhomboidal prism 150 enables the thickness of the structured-light projector 1 to be less than 3.5 mm.

In addition, by introducing the rhomboidal prism 150 into the structured-light projector 1, the first light beam from the first light source 11 have an increased light range to the diffractive optical element 12, so that the diffractive optical element 12 can better perform its focusing (collimating) function. Thus, the structured-light projector 1 does not need to be provided with a collimating mirror, which helps to further reduce the thickness of the structured-light projector 1.

Figure 2B:
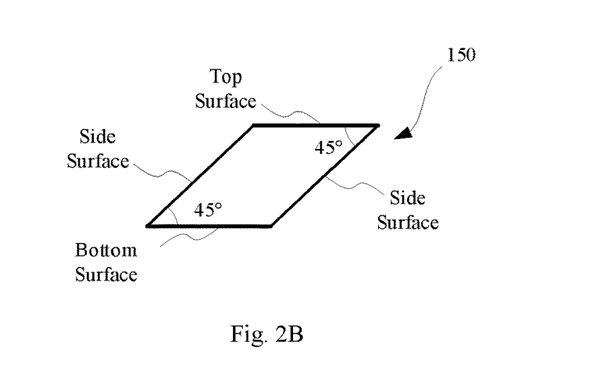
FIG. 2B shows a schematic diagram of an exemplary structure of the rhomboidal prism.

Optionally, referring to FIG. 2B, the angle between the side and the top surface of the rhomboidal prism 150 may be about 45°, and the angle between the side and the bottom surface of the rhomboidal prism 150 may also be about 45°. In addition, the rhomboidal prism 150 in some embodiments has a refractive index greater than 1.6 at its operating wavelength. With all the above features, the rhomboidal prism 150 ensures that total reflection of the first light beam occurs on its inner sides without the need for plating reflective films, which simplifies processing of the prism and reduces component complexity of the prism. At the same time, the rhomboidal prism 150 increases the distance that the first light beam need to travel before reaching the diffractive optical element 12, while without the direction of the first light beam being changed.

In application, the material and size of the rhomboidal prism 150 can be set according to the light-emitting area and the single-point divergence angle of the first light source 11. Specifically, if the full divergence angle of the light-emitting point of the first light source 11 is, the refractive index n of the rhomboidal prism 150 should satisfy the following inequality formula in order to allow the total reflection of the incident light to occur on the inner sides of the rhomboidal prism 150:

$$n \times \sin\left(45 - a\sin\left(\sin\frac{\theta}{n}\right)\right) \geq 1.$$

Should total reflection of the first light beam not occurring on the inner sides of the rhomboidal prism 150, the sides of the rhomboidal prism 150 can be coated with a reflective film in order to ensure that the first light beam is not transmitted out of the sides.

Optionally, the bottom and top surfaces of the rhomboidal prism 150 are coated with transmission-enhancing films in order to reduce or even eliminate light reflected by the bottom and top surfaces of the rhomboidal prism 150, thereby increasing its light transmission and reducing or even eliminating the effect of stray light.

In addition, the effective focal length of the diffractive optical element 12 is related to the size and refractive index of the rhomboidal prism 150, and in application the material and size of the rhomboidal prism 150 can be set according to luminescence parameters of the first light source 11.

Optionally, the effective focal length of the diffractive optical element 12 is 2-7 mm and the scattering replication level of the diffractive optical element 12 is greater than or equal to 3×3, at which time the diffractive optical element 12 is able to effectively replicate and focus (collimate) the first light beam after the steering.

Figure 3A:
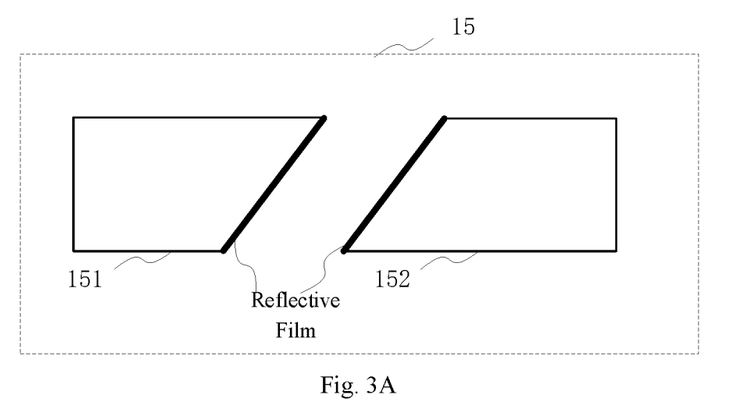
FIG. 3A shows a schematic structural diagram of an optical steering element in a structured-light projector according to an embodiment of the present disclosure, wherein the optical steering element includes two right-angled trapezoidal prisms.

FIG. 3A shows a schematic diagram of the structure of a structured-light projector in another embodiment. As shown in FIG. 3A, the optical steering element 15 in this embodiment includes a first right-angled trapezoidal prism 151, and a second right-angled trapezoidal prism 152. As shown in FIG. 3A, each of the right-angled trapezoidal prisms 151, 152 is provided with a bevel (or chamfer), wherein the two bevels are substantially opposite and parallel to each other.

The first right-angled trapezoidal prism 151 has a first reflecting surface and the second right-angled trapezoidal prism 152 has a second reflecting surface, the first reflecting surface and the second reflecting surface are located on the bevels and substantially parallel to each other, and the tilt angle of bevels with respect to the first light source 11 and the diffractive optical element 12 can be set according to practical needs, for example, 45°. In this embodiment, the first light beam enter the optical steering element 15 from the first port (located on the bottom of the optical steering element 15 in FIG. 3A), are subsequently reflected at the first reflecting surface before reaching the second reflecting surface, are then reflected again at the second reflecting surface, and are finally steered out of the second port (located on top of the optical steering element 15 in FIG. 1), at which point the steering of the first light beam is completed. The steering causes the first light beam to translate without changing the direction of propagation of the first light beam.

Optionally, the first reflecting surface is formed by coating the bevel of the first right-angled trapezoidal prism 151 with a highly reflective film, and the second reflecting surface is formed by coating the bevel of the second right-angled trapezoidal prism 152 with a highly reflective film.

Optionally, the diffractive optical element 12 is glued to bottom surfaces of the right-angled trapezoidal prisms 151 and 152, thereby further reducing the thickness of the overall module and facilitating the integration of the components.

In this embodiment, the right-angled trapezoidal prisms 151 and 152 increase the light range, so that the effective focal distance of the diffractive optical element 12 is larger and the scattering density is higher.

Figure 3B:
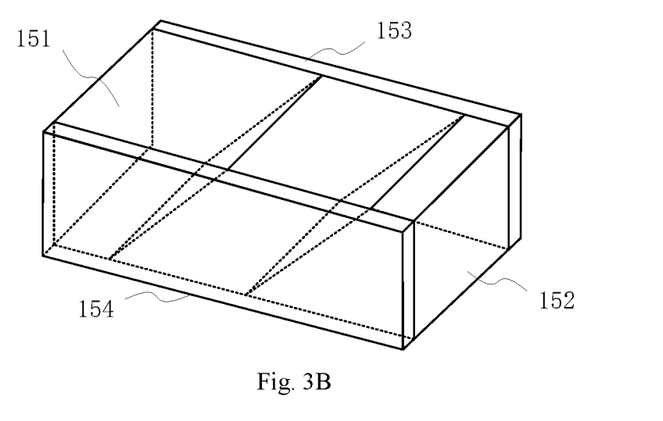
FIG. 3B shows a schematic diagram of an assembly structure of the optical steering element.

FIG. 3B shows a schematic diagram of an assembly structure of the optical steering element. As shown in FIG. 3B, the structured-light projector 1 further includes a first fixing plate 153, on which first side surfaces of the first and second right-angled trapezoidal prisms 151, 152 are disposed, and a second fixing plate 154, on which second side surfaces of the first and second right-angled trapezoidal prisms 151, 152 are disposed; the first fixing plate 153 and the second fixing plate 154 are made of, for example, flat glass or plastic. Each of the first and second right-angled trapezoidal prisms 151, 152 has the first side surface and the second side surface opposite to the first side surface, and both the first and second side surfaces are parallel to the bevels. In one embodiment, the first side surfaces of the first right-angled trapezoidal prism 151 and the second right-angled trapezoidal prism 152 are in contact with the first fixing plate 153, and the opposite second side surfaces of the first right-angled trapezoidal prism 151 and the second right-angled trapezoidal prism 152 are in contact with the second fixing plate 154. Such an assembly structure achieves an integration of the first right-angled trapezoidal prism 151 and the second right-angled trapezoidal prism 152, which facilitates easy assembly later on. In one embodiment, the first right-angled trapezoidal prism 151 and the second right-angled trapezoidal prism 152 may be glued to the first fixing plate 153 and the second fixing plate 154.

Figure 3C:
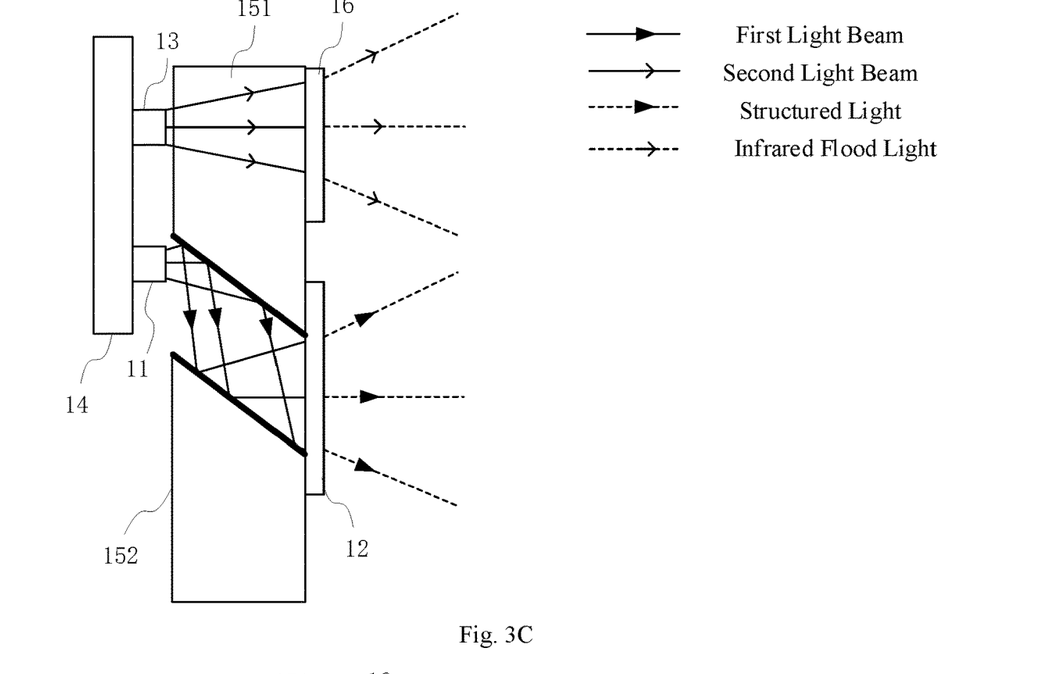
FIG. 3C shows a schematic diagram showing an alternative structure of the structured-light projector, comprising an optical homogenizer.

FIG. 3C shows a schematic diagram of an alternative structure of the structured-light projector, comprising an optical homogenizer. As shown in FIG. 3C, the structured-light projector 1 further includes an optical homogenizer 16, positioned on one side of the first right-angled trapezoidal prism 151 that is away from the second light source 13, with the second light beam first illuminating the optical homogenizer 16 through the top (in FIG. 3C, left surface) and bottom (in FIG. 3C, right surface) surfaces of the first right-angled trapezoidal prism 151 and then passing through the optical homogenizer 16 to form an infrared flood light.

Optionally, the light source in this embodiment is a horizontal-cavity surface-emitting laser, and the horizontal-cavity surface-emitting laser is an addressable array laser. The structured-light projector further includes a light source controller connected to the horizontal-cavity surface-emitting laser for controlling light-emitting points of the horizontal-cavity surface-emitting laser and controlling the intensity of the laser emitted by the horizontal-cavity surface-emitting laser to achieve phase shift and/or light-emitting timing control.

For example, the light source controller may be used to control luminescence timing of each light-emitting point in the horizontal-cavity surface-emitting laser to achieve timing encoding of the structured light. Specifically, the light source controller enables the surface of the target object to have different structured-light patterns at different moments by controlling light emitting sequence of different light-emitting points, and images obtained after 3D reconstruction based on such structured-light patterns have a high accuracy.

For example, the light source controller can control the current value of each light-emitting point in the horizontal-cavity surface-emitting laser to achieve light intensity transformation in the test space, and then achieve the phase shift of the structured light.

Figure 4:
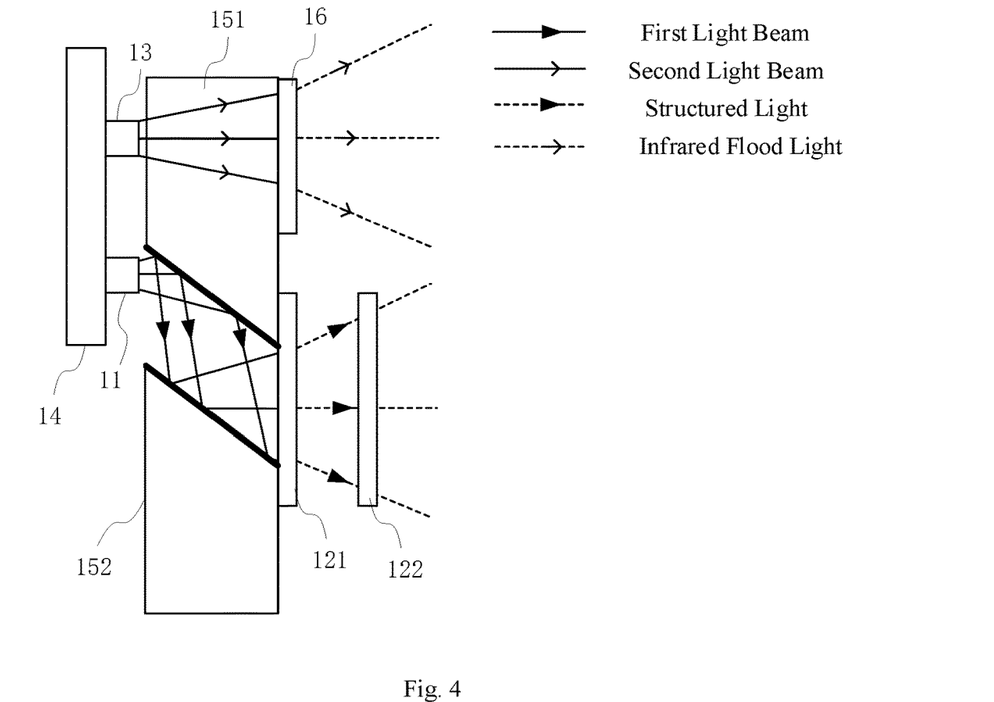
FIG. 4 shows a schematic structural diagram of a structured-light projector according to an embodiment of the present disclosure, comprising two diffractive optical elements.

Optionally, referring to FIG. 4 (with the optical steering element including two right-angled trapezoidal prisms as an example), the diffractive optical element 12 of FIG. 3C may include a first diffractive optical element 121, disposed on a side of the optical steering element away from the first light source, and configured to focus and replicate the first light beam from the optical steering element to form the structured light, and a second diffractive optical element 122 in FIG. 4. The second diffractive optical element 122 is disposed on aside of the first diffractive optical element 121 away from the rhomboidal prism 150 for replicating the structured light, and/or for adjusting light intensity distribution of the structured light.

Preferably, the structured light formed by the first diffractive optical element 121 is a striped structured light. The striped structured light may have a striped light intensity with a flat-top distribution in a lengthwise direction of the first diffractive optical element 121. The striped structured light may have a light intensity uniformity (which is equal to (Imax-Imin)/Mean) less or equal to 30%; and/or the light intensity of any strip of the striped structured light may have a Gaussian-like light intensity distribution or a flat-top distribution in a widthwise direction of the first diffractive optical element 121. The above light intensity distributions can be achieved by customizing the first diffractive optical element 121. Herein, the lengthwise direction refers to the length direction of a slit of the first diffractive optical element 121, and the widthwise direction is perpendicular to the lengthwise direction.

As can be seen from the above description, the structured-light projector 1 of the present embodiment is able to replicate the structured light by means of the second diffractive optical element 122, thus being able to produce a larger number of structured light patterns on the target object. Compared to existing technologies, the structured-light projector 1 described in this embodiment has the advantages of simple structure, low cost, small size, and suitability for mass production.

Figure 5:
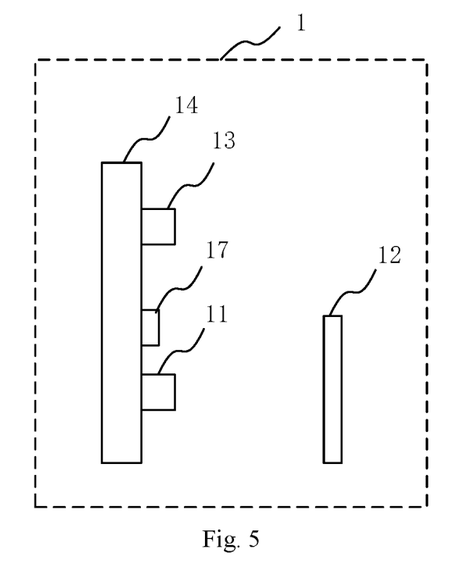
FIG. 5 shows a schematic structural diagram of a structured-light projector according to another embodiment of the present disclosure.

FIG. 5 shows a schematic structural diagram of a structured-light projector according to another embodiment of the present disclosure. As shown in FIG. 5, the structured-light projector 1 of this embodiment further includes an optical-energy detecting element 17. The optical-energy detecting element 17 is configured to detect the optical power/energy of the first light beam reflected back by the diffractive optical element 12. Based on the optical energy, it can be determined whether the diffractive optical element 12 is in a normal operating condition. Specifically, when the optical energy is abnormal, the diffractive optical element 12 can be determined to be in an abnormal condition, when the structured-light projector 1 should be turned off to avoid laser hazardous to humans. When the optical energy is normal, the diffractive optical element 12 can be determined to be in a normal operating condition. In some embodiments, a device provided inside or outside the structured-light projector 1 is configured to perform at least one of the above-mentioned functions of detection, determination and turning off.

Optionally, the optical-energy detecting element 17 is, for example, a photodiode (PD).

Optionally, the optical-energy detecting element 17 may be provided on the substrate 14.

Figure 6:
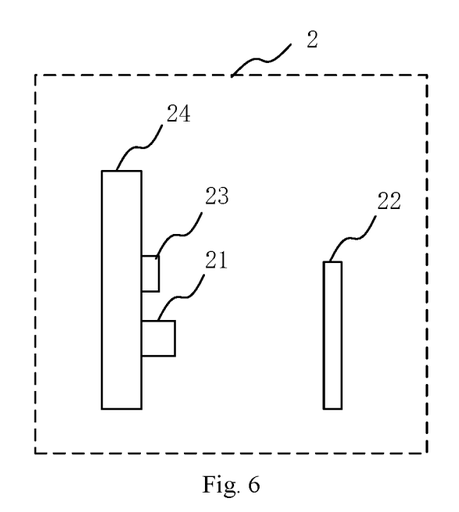
FIG. 6 shows a schematic structural diagram of a structured-light projector according to another embodiment of the present disclosure.

FIG. 6 shows a further structural diagram of the structured-light projector described in this embodiment of the present disclosure. As shown in FIG. 6, the structured-light projector 2 includes a light source 21, a diffractive optical element 22, and an optical-energy detecting element 23. The structured-light projector 2 in this embodiment has only one light source, i.e., the light source 21. The light source 21 is configured to emit light. The diffractive optical element 22 is positioned on a light-emitting side of the light source 22 and is configured to generate structured light based on the light incident on the diffractive optical element 22. The optical-energy detecting element 23 is position on a side of the diffractive optical element 22 near the light source 21 and is configured to detect the optical power of the light after it has been reflected by the diffractive optical element 22.

Optionally, the structured-light projector 2 may further include a substrate 24 on which the light source 21 and the optical-energy detecting element 23 are installed.

Optionally, the structured-light projector 2 may further include a second light source emitting infrared light, and the second light source is preferably an infrared flood light source.

The present disclosure also provides a camera assembly. The camera assembly includes: a structured-light projector as described in the present disclosure, an image collector, and an image processor. The image collector is configured to capture a pattern formed by light emitted through the structured-light projector. The image processor is electrically coupled to the image collector and is configured to perform image processing on the pattern.

The present disclosure also provides an electronic device. The electronic device includes a camera assembly as described in the present disclosure.

In summary, in the structured-light projector described in one or more embodiments of the present disclosure, the first light beam can be generated using the first light source, the first light beam then pass through the diffractive optical element to form the structured light, and when the structured light irradiates the target object, a scattered image on the surface of the target object can be captured using the image collector. Meanwhile, the second light beam can be generated using the second light source, the second light beam is infrared light, and when the second light beam irradiate the target object, an infrared image of the target object can be captured using the image collector. Thus, the structured-light projector of the present disclosure can acquire both a scattered image and an infrared image of the target object. In addition, in one or more embodiments of the present disclosure, by introducing the optical steering element into the structured-light projector, the first light beam from the first light source reaches the diffractive optical element with an increased light range, and thus the diffractive optical element is able to perform its focusing (collimating) function better. Thus, the structured-light projector does not need to be provided with a collimating mirror, which helps to further reduce the thickness of the structured-light projector. Further, in this embodiment, the optical steering element can be realized by two right-angled trapezoidal prisms set opposite to each other, where the first diffractive optical element can be glued to the bottom surface of the right-angled trapezoidal prisms to further reduce the thickness of the structured-light projector, thus reducing the thickness of the structured-light projector while the effective focal length of the diffractive optical element remains the same.

In addition, the structured-light projector of one or more embodiments of the present disclosure may further include an optical-energy detecting element, which detects return power of the diffractive optical element, and according to the return power, it can be determined if the diffractive optical element is working properly.

Therefore, the present disclosure effectively overcomes various shortcomings of the prior art and has a high industrial value.

The above-mentioned embodiments only exemplarily illustrate the principles and effects of the present disclosure, but are not used to limit the present disclosure. Any person skilled in the art may modify or change the above embodiments without violating the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A structured-light projector, comprising:
a first light source, configured to emit a first light beam;
a diffractive optical element, disposed on a light-emitting side of the first light source, and configured to generate structured light based on the first light beam incident on the diffractive optical element;
a second light source, comprising a light emitter configured to emit a second light beam, wherein the second light beam comprises infrared light; and
an optical steering element, disposed between the first light source and the diffractive optical element, and configured to steer the first light beam entering from a first port of the optical steering element toward a second port of the optical steering element so that the first light beam is emitted from the second port,
wherein the optical steering element comprises a first right-angled trapezoidal prism and a second right-angled trapezoidal prism which have bevels set opposite to each other and parallel to each other.

2. The structured-light projector of claim 1, wherein the second light source is configured as a surface-emitting light source, and emits infrared flood light based on the second light beam.

3. The structured-light projector of claim 1, wherein the second light source further comprises an optical micro-structure, wherein the optical micro-structure is configured to adjust optical paths of the second light beam, and the second light source emits infrared flood light based on the second light beam through the optical micro-structure.

4. The structured-light projector of claim 1, wherein the second light source further comprises an optical homogenizer, and the second light source emits uniform infrared flood light based on the second light beam through the optical homogenizer.

5. The structured-light projector of claim 1, wherein the light emitter comprises a vertical-cavity surface-emitting laser, a side-emitting laser, or a light-emitting diode.

6. The structured-light projector of claim 1, wherein the second light source is disposed in an out-of-focus position of the diffractive optical element, and the second light beam passes through the diffractive optical element to form infrared flood light.

7. The structured-light projector of claim 1, further comprising:
an optical homogenizer, disposed on a side of the second right-angled trapezoidal prism away from the second light source,
wherein the second right-angled trapezoidal prism is closer to the second light source than the first light source, and faces the second light source,
wherein the second light beam passes through two parallel bottom surfaces of the second right-angled trapezoidal prisms to reach the optical homogenizer, and then passes through the optical homogenizer to form infrared flood light.

8. The structured-light projector of claim 1, further comprising:
a first fixing plate, on which first side surfaces of the first and second right-angled trapezoidal prisms are disposed; and
a second fixing plate, on which second side surfaces of the first and second right-angled trapezoidal prisms are disposed,
wherein each of the first and second right-angled trapezoidal prisms has the first side surface and the second side surface opposite to the first side surface, and both the first and second side surfaces are parallel to the bevels.

9. The structured-light projector of claim 1, wherein the optical steering element is a rhomboidal prism which refracts the first light beam entering from the first port and then steers the first light beam out of the second port.

10. The structured-light projector of claim 9, wherein an angle between a side surface and a top surface of the rhomboidal prism and an angle between a side surface and a bottom surface of the rhomboidal prism are both 45°, and the rhomboidal prism has a refractive index greater than 1.6 at its operating wavelength.

11. The structured-light projector of claim 10, wherein the top surface and the bottom surface of the rhomboidal prism are coated with transmission-enhancing films.

12. The structured-light projector of claim 1, further comprising a substrate that supports the first light source and the second light source.

13. The structured-light projector of claim 1, further comprising an optical-energy detecting element that detects optical power of the first light beam reflected back by the diffractive optical element.

14. The structured-light projector of claim 1, wherein the diffractive optical element comprises:
a first diffractive optical element, disposed on a side of the optical steering element away from the first light source, and configured to focus and replicate the first light beam from the optical steering element to form the structured light, and
a second diffractive optical element, disposed on a side of the first diffractive optical element away from the optical steering element, and configured to replicate the structured light, and/or to adjust light intensity distribution of the structured light.

15. The structured-light projector of claim 14, wherein the first diffractive optical element has an effective focal length ranging from 2 mm to 7 mm and a scattering replication level greater than or equal to 3×3.

16. A camera assembly, comprising:
the structured-light projector of claim 1;
an image collector, configured to collect a pattern formed by light emitted by the structured-light projector; and
an image processor, electrically coupled to the image collector, and configured to perform image processing on the pattern.

* * * * *